May 17, 1932.  W. F. GRANT  1,858,587
VALVE SEAL
Filed Sept. 6, 1929
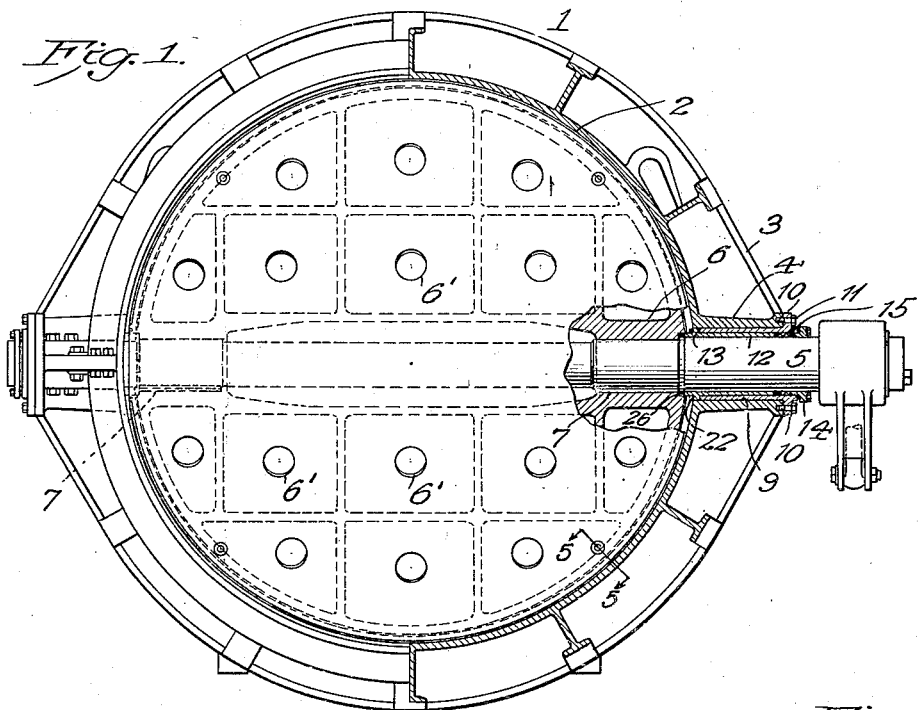
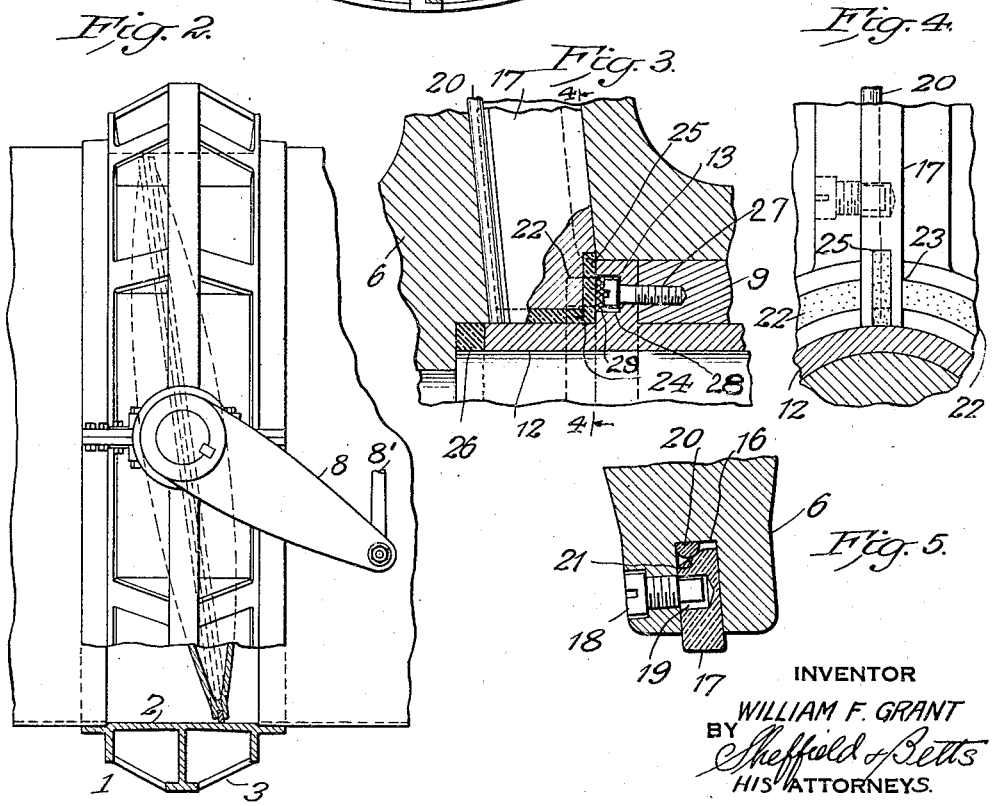
INVENTOR
WILLIAM F. GRANT
BY Sheffield & Betts
HIS ATTORNEYS.

Patented May 17, 1932

1,858,587

UNITED STATES PATENT OFFICE

WILLIAM F. GRANT, OF NEWPORT NEWS, VIRGINIA, ASSIGNOR TO NEWPORT NEWS SHIPBUILDING AND DRY DOCK COMPANY, A CORPORATION OF VIRGINIA

VALVE SEAL

Application filed September 6, 1929. Serial No. 390,717.

This invention relates in general to butterfly valves adapted for large hydraulic installations, such as, for example, in penstocks for hydraulic turbines, comprising a valve casing with diametrically opposite bearings adapted to support a shaft on which the valve disc is mounted. The invention has particular reference to the seal ring positioned in a groove in the periphery of the valve disc and which seats on the inner surface of the valve casing, and also to packing means adjacent the valve shaft adapted to reduce the leakage of water through the valve to a minimum.

The present invention comprises certain improvements over the sealing arrangements illustrated and described in Patent No. 1,188,462, granted to Daniel J. McCormack, June 27, 1916.

The principal object of the present invention is to provide means in the form of a ring located in the groove in the periphery of the valve disc and resilient means for urging the seal ring located therein outward so as to seat the ring firmly against the valve housing. These resilient means also prevent leakage of water around the seal ring.

Heretofore the water has had a tendency to pass down one side of the ring, across the bottom, up past the other side of the ring, and out, thus permitting undesirable leakage.

Another object of the invention is to provide sealing means to prevent leakage of water between the valve shaft and the ends of the segments comprising the seal ring.

A further object of the invention is to provide sealing means to prevent leakage of water around the valve shaft.

A still further object is to provide a special bearing shell adapted to support the valve shaft and to contact with the seal ring and the periphery of the valve disc to reduce further leakage around the valve shaft.

Further objects will be apparent from the following description, and the invention will be better understood when the description is taken in conjunction with the drawings, in which Fig. 1 is a front view of the valve housing and valve disc showing portions of each in cross-section.

Fig. 2 is a side view of the valve casing showing in dotted lines the valve disc in closed position.

Fig. 3 is an enlarged partial cross-sectional view of the sealing arrangements adjacent the valve shaft.

Fig. 4 is a cross-sectional view taken substantially along the line 4—4 of Fig. 3, and Fig. 5 is a cross-sectional view of the periphery of the valve disc taken substantially along the line 5—5 of Fig. 1.

Referring now more particularly to Figs. 1 and 2, the numeral 1 indicates, in general, the valve housing, which has a smooth interior surface 2 against which the margin of the butterfly valve disc contacts. Casing 1 is braced externally as indicated at 3 and has formed, preferably integral therewith, the diametrically opposite journal boxes 4 which are adapted to support the journals of the valve shaft 5. This valve shaft extends through the journal boxes 4 as shown in Fig. 1, and has mounted thereon in the interior of the valve casing a valve disc 6, preferably comprising two curved outer plates reinforced by internal webs and having holes 6' in one of said plates. This is fixed on the shaft 5 by means of the keys 7. The valve is moved from open to closed positions and vice versa by means of the crank arm 8, which is connected by a rod 8' with a suitable means for operating the same, not shown in the drawings.

The preferred means for supporting the valve shaft will now be described, reference being had more particularly to Figs. 1 and 3. A bearing sleeve 9 comprising a cylindrical portion having an external flange 10 adjacent its outer end is positioned within the journal box 4 and is secured thereto by the bolts 11.

A bushing 12 is positioned within the sleeve 9 and is provided at its inner end with the flange 13, the external diameter of which is approximately the same as the internal diameter of the journal box 4. It will be understood therefore that the bushing 12 may be moved toward the valve disc 6 by tightening the bolts 11 in the bearing sleeve 9. Packing 15, to prevent the leakage of water through the bearing supports, is positioned between the outer end of the bushing 12 and a packing gland 14.

Referring now more particularly to Figs. 3-5 inclusive, it will be seen that the periphery of the valve disc 6 has a groove 16 therein into which is inserted the semi-circular seal ring segments 17, as more clearly shown in Fig. 5. This seal ring is composed of two resilient segments of bronze or other similar material substantially rectangular in cross-section. As shown in Fig. 3, the ends of the seal ring segments abut against the bushing 12. These segments are prevented from falling out of the groove 16 by means of the retaining bolts 18 screwed through one side of the valve disc 6 and projecting into suitable recesses 19 in the seal ring segments, as shown in Fig. 5. When the valve is closed, as shown in Fig. 2, the outer margins of the seal ring segments contact with the interior surface 2 of the valve casing.

These segments are normally urged outwardly by their own resiliency and by means of resilient packing ring segments 20 which may be and preferably are of round cord packing impregnated with soft rubber. The inner edges of the seal ring segments 17 are beveled, as indicated at 21, and the packing ring segments 20 are positioned between these beveled surfaces 21 and the bottom of the groove 16. In addition to urging the seal ring segments 17 outward the packing ring segments 20 prevent water from leaking around the seal ring segments 17.

In Figs. 3 and 4 it will be observed that the valve disc 6 has a substantially circular groove therein in which a packing ring 22 of suitable soft material is inserted. The ends of this ring abut against the lateral faces of the seal ring segments 17 as indicated at 23 in Fig. 4. One face of the ring 22 contacts with the inner face of the flange 13 on the bushing 12.

The ends of the seal ring segments 17 have grooves therein into which suitable packing material 24 is inserted which prevents leakage of water between the bushing 12 and the ends of the seal ring segments 17. As pointed out above, the ends of the seal ring segments seat on the bushing 12, which is stationary, whereas it has heretofore been the practice to seat the ends of these segments on the valve shaft which rotates with the seal ring segments. My arrangements is preferable as the rubbing of the packing material 24 on the bushing 12 tends to wear the packing material to a firm seat.

The outer edges of the seal ring segments 17 and the valve disc have flat surfaces machined thereon, which make a running fit with the face of the flange 13 of the bushing 12, which practically prevents leakage between these segments and this flange. In order to prevent the leakage between these parts still more effectively, the faces of the segments 17 are grooved and suitable packing material 25 is inserted therein as shown in Figs. 3 and 4. If it be so desired, an integral L-shaped piece of packing material may be inserted in the grooves in the segment 17 instead of the separate packings 24 and 25.

Between the inner end of the bushing 12 and the valve disc 6 a soft packing ring 26 is positioned and is compressed by the inward movement of the bushing 12 which, as pointed out above, is controlled by the bolts 11 (see Fig. 1) which hold the bearing sleeve 9 in position.

In order to prevent the bushing 12 from rotating it is secured to the bearing sleeve 9 by means of several bolts 27 whose heads lie in the recesses 28 in the flange 13 and which are screwed into the bearing sleeve 9 as shown in Fig. 3. The recesses 28 are preferably filled with such material as babbitt as indicated at 29 in order that the inner surface of the flange 13 will be smooth and continuous.

Having thus described this specific form of the invention, it is not to be understood that the invention is limited to the details and arrangement of parts set forth, for various changes may be made without departing from the spirit and scope of the invention as set forth in the appended claims.

What is claimed and desired to be protected by Letters Patent is:

1. In an hydraulic valve structure of the butterfly type, a bushing in which the valve shaft rotates, and packing means surrounding said bushing between the same and the valve disc.

2. In an hydraulic valve structure of the butterfly type, a bushing in which the valve shaft rotates and annular packing means surrounding said bushing and located between an extension on said bushing and the valve disc.

3. In a hydraulic valve structure of the butterfly type including a casing and a disk movable therein upon an axis transverse thereto, the disk having its periphery formed with a groove, segments of a metallic seal ring located within said groove and adapted to engage the valve casing, non-metallic packing means located in said groove and engaging the inner periphery of said segments to urge said segments outward while maintaining a sealed relation between the segments and the bottom of the groove for preventing passage of water across said groove.

4. In an hydraulic valve structure of the butterfly type having segments of a seal ring located in a groove in the periphery of the valve disc and which are adapted to engage the valve casing, a bushing in which the valve shaft rotates, and packing means set in grooves between the valve disc and an extension on said bushing.

5. In an hydraulic valve structure having segments of a seal ring located in a groove in the periphery of the valve disc and which are adapted to engage the valve casing, a bushing in which the valve shaft rotates and circular packing segments surrounding said bushing and set in grooves in the valve disc, said packing segments contacting with said bushing, and the ends of said segments abutting against the sides of the first named segments.

6. In an hydraulic valve structure having segments of a seal ring located in a groove in the periphery of the valve disc and which are adapted to engage the valve casing, a bushing in which the valve rotates, said segments contacting with said bushing and packing means in said segments to prevent leakage between said segments and said bushing.

7. In an hydraulic valve structure having segments of a seal ring located in a groove in the periphery of the valve disc and which are adapted to engage the valve casing, a bushing in which the valve shaft rotates, said bushing being provided with a flange with which said segments contact and packing strips in grooves in the face of said segments contacting with said flange to prevent leakage between said segments and said bushing.

8. In an hydraulic valve structure having segments of a seal ring located in a groove in the periphery of the valve disc and which are adapted to engage the valve casing, a bushing in which the valve shaft rotates, the ends of said segments contacting with said bushing and packing, means in the ends of said segments to prevent leakage around said bushing.

9. In an hydraulic valve structure having segments of a seal ring located in a groove in the periphery of the valve disc and which are adapted to engage the valve casing, a valve shaft for said disc, journal boxes for said shaft, sleeves within said boxes, bushings within said sleeves and in which said shaft rotates, and having flanges thereon, packing glands outside of said bushings, packings between said bushings and said packing glands, the ends of said segments contacting with said bushing, and packing material between said segments and said bushing and between said segments and said flanges.

10. In an hydraulic valve structure having segments of a seal ring located in a groove in the periphery of the valve disc and which are adapted to engage the valve casing, a valve shaft for said disc, journal boxes for said shaft, sleeves within said boxes, bushings within said sleeves and in which said shaft rotates, and having flanges thereon, packing glands outside of said bushings, packing between said bushings and said packing glands, the ends of said segments contacting with said bushings, packing material between said segments and said bushing and between said segments and said flanges, and annular packing rings between said segments and said flanges and surrounding said bushings.

11. In a hydraulic valve structure of the butterfly type including a casing and a disk movable therein upon an axis transverse thereto, the disk having its periphery formed with a groove, segments of a metallic seal ring located within said groove and adapted to engage the valve casing, non-metallic packing means located in said groove and engaging the inner periphery of said segments to urge said segments outward while maintaining a sealed relation between the segments and the bottom of the groove for preventing passage of water, said segments having their inner peripheries beveled off at one edge, the beveled surface engaging said non-metallic packing for confining the same within one corner of the groove whereby the packing will constantly contact one side wall as well as the bottom of the groove.

In testimony whereof I affix my signature.

WILLIAM F. GRANT.